United States Patent [19]

Clendaniel

[11] 3,936,001

[45] Feb. 3, 1976

[54] ANTI-SAG DEVICE FOR PAPER MILL SHOWERS

[75] Inventor: William Richard Clendaniel, Andover, Mass.

[73] Assignee: Bolton-Emerson, Inc., Lawrence, Mass.

[22] Filed: Dec. 9, 1974

[21] Appl. No.: 530,737

[52] U.S. Cl. ................ 239/289; 239/200; 239/602; 248/58; 248/65; 248/72; 248/201; 162/275

[51] Int. Cl.².. B05B 1/20; B05B 13/02; D21F 1/32; F16L 3/10

[58] Field of Search .............................. 84/403–405; 248/72, 201, 58, 65; 162/308, 310, 275, 276; 14/4–7, 15; 239/200, 548, 566, 567, 208, 209, 289, 602

[56] References Cited

UNITED STATES PATENTS

| | | | |
|---|---|---|---|
| 871,574 | 11/1907 | Dorgan | 239/209 X |
| 1,508,028 | 9/1924 | Robinson | 239/289 X |
| 1,972,001 | 8/1934 | Witham et al | 162/275 UX |
| 2,290,139 | 7/1942 | Buchanan | 248/58 |
| 2,707,414 | 5/1955 | Marshall | 84/405 |
| 3,291,681 | 12/1966 | Wolf | 162/275 |
| 3,604,676 | 9/1971 | Weber | 248/72 X |

FOREIGN PATENTS OR APPLICATIONS

| | | | |
|---|---|---|---|
| 1,149,550 | 4/1969 | United Kingdom | 248/65 |
| 324,012 | 1/1930 | United Kingdom | 239/289 |

*Primary Examiner*—Robert S. Ward, Jr.
*Attorney, Agent, or Firm*—Pearson & Pearson

[57] ABSTRACT

An elongated shower pipe, extending across a paper stock treatment machine, such as a Fourdrinier, instead of being a uniformly simply supported span, is supported on brackets at each end designed to significantly reduce the deflection of the shower pipe. The brackets include fixed supports inboard of the ends and deflection means, outboard of the supports, which apply a moment of force in a direction opposite to the forces exerted by the gravity on the central span of the pipe. Threaded means adjusts the amount of anti-sag force.

4 Claims, 7 Drawing Figures

ANTI-SAG DEVICE FOR PAPER MILL SHOWERS

BACKGROUND OF THE INVENTION

It has long been a problem to properly support paper machine shower pipes, which may extend twenty or thirty feet across the Fourdrinier wire of a typical paper machine. Such pipes must usually be of greater diameter and greater wall thickness than necessary for hydraulic capacity in order to provide the necessary structural strength to avoid sag or breakage.

In U.S. Pat. No. 2,884,203 to Broughton of Apr. 28, 1959, sagging due to the weight of a shower pipe is countered by a pair of tension rods, or braces, anchored to the casting of the brackets and each extending out to the center of the pipe.

In U.S. Pat. No. 3,279,976 to Eagle of Oct. 18, 1966, the shower pipe is given additional rigidity by a hollow hood extending across the machine above the pipe and fixed at each end to the end brackets.

In U.S. Pat. No. 3,161,125 to Hornboutel of Dec. 15, 1964, a hollow shell of a crown roll is given rigidity by an elongated shaft extending through the shell, the bearings for the opposite ends of the shaft tending to prevent sag of the shell by reason of an annular collar on the shaft supporting the shell against central deflection.

SUMMARY OF THE INVENTION

In this invention, a twenty or thirty foot long shower pipe, filled with showering liquid, is free of any tension rods, hollow beam attachments or the like in the central span portion. It is also free of any central concentric reinforcing shafts such as disclosed in the above-mentioned Witham patent.

The shower pipe of the invention is free of central deflection, sag or tendency to break under its own unsupported weight, and is capable of being of the reduced diameter and wall thickness required only for hydraulic capacity by reason of improved supporting brackets.

The improved brackets of the invention are fixed for example to the floor, base or machine frame and include pipe supports inboard of the ends and pipe deflectors outboard of the support for applying a moment of force on the other side of the supports to counter the moment of force exerted by gravity on the central, unsuported span of the pipe.

BRIEF DESCRIPTION OF THE DRAWING

In FIGS. 1, 2 and 3, F1 represents the resultant of the uniformly distributed lead on the pipe;

FIG. 2 is a diagramatic view similar to FIG. 1, showing the same shower pipe with end moments (MO) applied outboard of the pipe supports. End moments applied in the direction shown tend tto cause a deflection opposite to that caused by F1.

FIG. 3 is a diagramatic view of the same shower pipe when the end moments of force are applied by the brackets of the invention;

DESCRIPTION OF A PREFERRED EMBODIMENT

Figure 1:
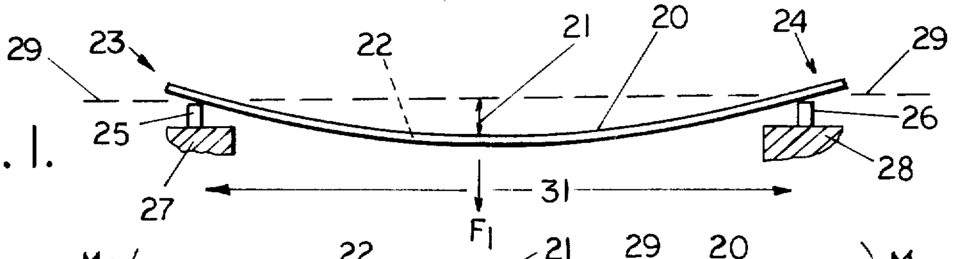
FIG. 1 is a diagrammatic view showing force exerted on a conventional shower pipe and the resulting deflection.

As shown in FIG. 1, it is conventional practice to support paper machine shower pipes 20, in such a way that they are simply supported beams, uniformly loaded. As shower pipe length increases, for wider paper machines twenty or thirty feet in width, the diameter of the pipe and usually also the wall thickness must be correspondingly increased to increase the stiffness and thereby keep central deflection, or sag 21 within tolerable limits. In FIG. 1, the elongated pipe 20, full of water 22, is supported proximate each opposite end 23 or 24 by the supports 25 and 26 which are fixed to the floor, base or machine frame 27 or 28.

Figure 2:
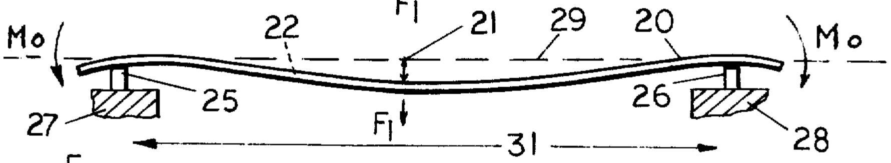

It has been found that deflection below the normal centroidal axis 29, of the unsupported span 31 of pipe 20, between supports 25 and 26, can be reduced and even brought to zero, as shown in FIG. 2, by applying the end moments (MO) at each end of the pipe, outboard of the supports 25 and 26.

Figure 3:
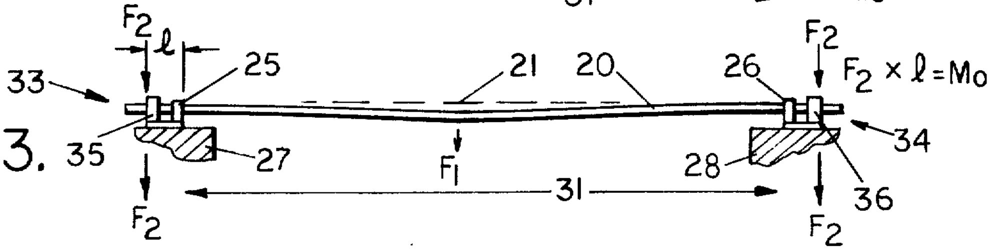

As shown in FIG. 3, in practice the commercial embodiment of the invention comprises the brackets 33 and 34, each having a support 25 or 26 inboard of the ends 23 or 24, and having a deflection element 35 or 36, outboard of the supports, for applying the moments of force F2 necessary to counter the force of gravity F1 exerted on the unsupported span 31. The force F2 exerted in a direction opposite to the force F1, on the opposite side ofthe supports 25 and 26 permits the use of smaller diameter pipes 20, sized for hydraulic capacity rather than for structural stiffness.

The method and apparatus of the invention can beused in stationary, reciprocating or oscillating showers, so long as the brackets 33 and 34 exert the counter force F2 in a direction opposite to gravity force F1.

A preferred embodiment of the invention is shown in FIGS. 4-7, wherein the pipe 20 is supported at each opposite end in brackets 33 and 34, each including a plate 37 or 38 to which a support 25 or 26 and a deflection element 35 or 36 is affixed. The plate 37 or 38 of each bracket is suitably affixed to the floor, base, or machine frame 27 or 28 under the ends 23 or 24 of pipe 20 by bolts 39. The term end is used although it will be understood that the pipe may continue on in one direction or the other to a liquid supply, or may reciprocate in the brackets, so that "end" is used in the sense of end of the unsupported span 31 of pipe 20.

Each support 25 or 26 preferably includes support means in the form of a U-shaped saddle 41, pivotable on pivot stub shafts 42 or 43 in a pair of posts 44 or 45 so that the saddle may be inverted to hold the pipe 20 in inverted position as shown in FIG. 2. If the pipe 20 is to reciprocate the saddle 41 will include suitable rollers, not shown. The posts 44 or 45 are welded or bolted to the plate in a well known manner. Each support means is fixed at a predetermined distance inboard of the ends 23 or 24 of pipe 20, so that there will be an overhang 46 or 47 against which the downward deflection means 35 or 36 can operate.

Each deflection means 35 or 36 preferably includes a saddle 51 or 52 having flanges 53 and arranged to partially encircle an end 23 and 24 of pipe 20 outboard of the support mean 25 or 26. A pair of threaded bolts 54 and 55, and a seet of threaded nuts 56 and 57 serve to hold down the saddles 51 or 52 on the plate 37 or 38 to exert the moment of force F2 which counters the gravity force F1.

Figure 4:
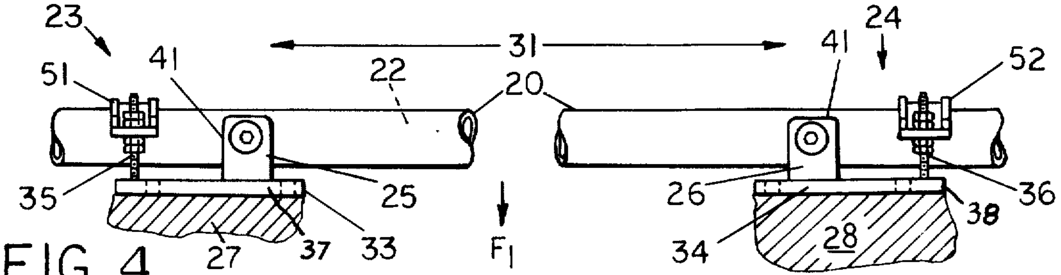
FIG. 4 is an enlarged view showing a shower pipe supported in the anti-sag apparatus of the invention.
Figure 5:
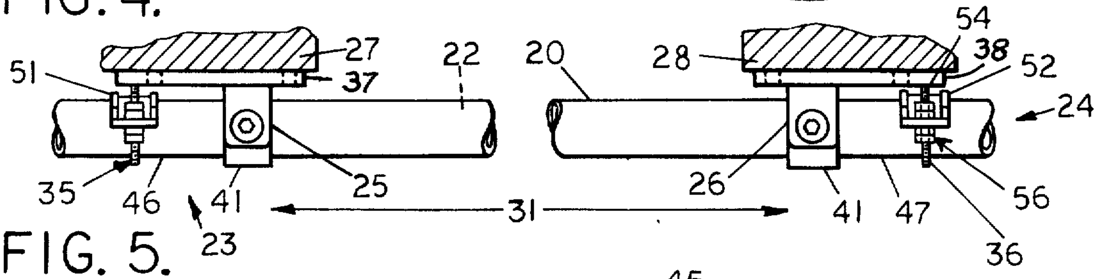
FIG. 5 is a view similar to FIG. 4 showing the anti-sag apparatus invented.
Figure 6:
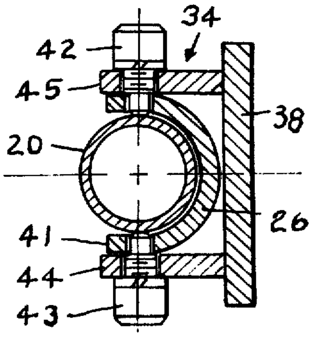
FIG. 6 is an end view on line 6—6 of FIG. 7.
Figure 7:
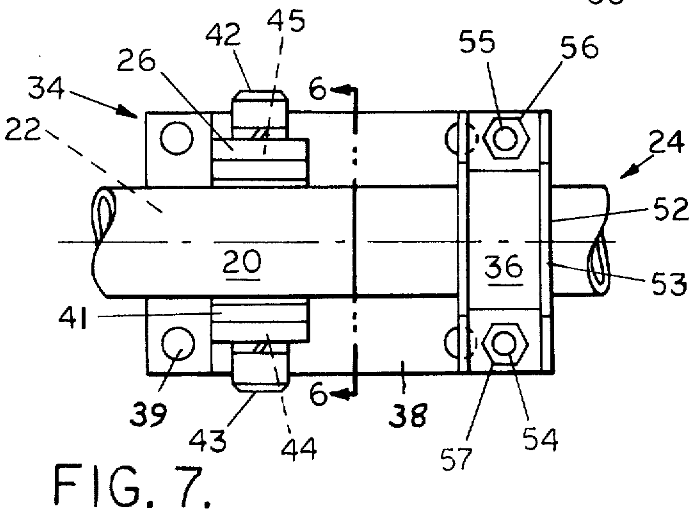
FIG. 7 is a top plan view of the anti-sag bracket of the invention.

As shown in FIG. 4 if the pipe and brackets are to depend for example from a superstructure over the paper machine, the saddles 41 and 42 are inverted as are the saddles 51 and 52 to accomplish the counter force desired.

I claim:

1. Anti-sag apparatus for elongated shower pipes of the type extending across a paper stock treatment machine said apparatus comprising:

an elongated pipe of predetermined length and diameter having opposite ends;

a pair of brackets, each fixed under one of said ends and each having a support means thereon, fixed at a predetermined distance inboard of said end for supporting said pipe against downward movement and each said bracket having downward deflection means, located at a predetermined distance outboard of one of said support means for holding down the adjacent end of said pipe whereby the portion of said pipe, between said brackets, may be free of braces, tie rods and reinforcing structures, supported against sag and of a diameter and thickness required for hydraulic capacity rather than for structural stiffness.

2. Anti-sag apparatus as specified in claim 1 wherein said downward deflection means includes threaded elements, for adjusting the degree of deflection.

3. Anti-sag apparatus as specified in claim 1 wherein said downward deflection means comprises a saddle extending around the upper portion of said pipe and a pair of threaded elements connecting each opposite end of said saddle to said brackets.

4. Anti-sag apparatus as specified in claim 1 wherein, each said bracket includes a plate, said support means is a U-shaped saddle pivotally supported between two posts fixed to said plate and said deflection means is an inverted U-shaped saddle, attached at each end to said plate by one of a pair of threaded bolts.

* * * * *